(12) United States Patent
Ussing

(10) Patent No.: US 9,486,802 B2
(45) Date of Patent: Nov. 8, 2016

(54) METHOD OF CONTROLLING A FLOW

(75) Inventor: Tomas Ussing, Frederiksberg (DK)

(73) Assignee: FLUIMEDIX APS, Taastrup (DK)

( * ) Notice: Subject to any disclaimer, the term of this patent is extended or adjusted under 35 U.S.C. 154(b) by 330 days.

(21) Appl. No.: 13/980,408

(22) PCT Filed: Jan. 18, 2012

(86) PCT No.: PCT/EP2012/050680
§ 371 (c)(1),
(2), (4) Date: Oct. 3, 2013

(87) PCT Pub. No.: WO2012/098140
PCT Pub. Date: Jul. 26, 2012

(65) Prior Publication Data
US 2014/0014192 A1 Jan. 16, 2014

(30) Foreign Application Priority Data

Jan. 21, 2011 (DK) .................................. 2011 70034

(51) Int. Cl.
*B01L 3/00* (2006.01)
*F16K 99/00* (2006.01)

(52) U.S. Cl.
CPC ............ *B01L 3/00* (2013.01); *B01L 3/502738* (2013.01); *F16K 99/0001* (2013.01); *F16K 99/004* (2013.01); *F16K 99/0017* (2013.01); *F16K 99/0021* (2013.01); *F16K 99/0042* (2013.01); *B01L 2300/1811* (2013.01); *B01L 2300/1816* (2013.01); *B01L 2300/1866* (2013.01); *B01L 2400/0436* (2013.01); *B01L 2400/0688* (2013.01); *F16K 2099/0084* (2013.01); *Y10T 137/0391* (2015.04); *Y10T 137/206* (2015.04)

(58) Field of Classification Search
CPC .. B01L 3/00; F16K 99/0017; F16K 99/0001; F16K 99/0021; F16K 2099/0086
USPC .................................................... 137/803, 828
See application file for complete search history.

(56) References Cited

U.S. PATENT DOCUMENTS

| 4,512,371 | A | * | 4/1985 | Drzewiecki | ............... F15C 1/04 |
| | | | | | 137/1 |
| 6,010,316 | A | * | 1/2000 | Haller et al. | .................. 417/322 |
| 6,360,775 | B1 | * | 3/2002 | Barth | ................... G02B 6/3538 |
| | | | | | 137/803 |
| 2001/0055529 | A1 | | 12/2001 | Wixforth | |
| 2004/0007275 | A1 | * | 1/2004 | Hui Liu | ............ B01L 3/502738 |
| | | | | | 137/828 |
| 2005/0037507 | A1 | | 2/2005 | Gauer | |
| 2006/0040375 | A1 | | 2/2006 | Arney et al. | |
| 2006/0144871 | A1 | * | 7/2006 | Van Tuyl | ............. G01N 29/024 |
| | | | | | 222/420 |
| 2009/0308473 | A1 | * | 12/2009 | Shinoda | ................ B01F 3/0819 |
| | | | | | 137/827 |

OTHER PUBLICATIONS

International Search Report cited by the European Patent Office in International Patent Application No. PCT/EP2012/050680 (May 2, 2012).

(Continued)

*Primary Examiner* — Eric Keasel
*Assistant Examiner* — Paul J Gray
(74) *Attorney, Agent, or Firm* — Michael Best & Friedrich LLP

(57) ABSTRACT

The present invention relates to a method of controlling a flow in a micro conduit system, and particularly a micro conduit system comprising one or more capillary-stop valves (6,6') wherein the stopping ability of the capillary stop valve is overcome with the help of an acoustic wave source.

29 Claims, 5 Drawing Sheets

(56) References Cited

OTHER PUBLICATIONS

Luong et al., Micro and Nanosystems, "Surface Acoustic Wave Driven Microfluidics—A Review," vol. 2(3) (2010).

Man et al., Micro Electro Mechanical Systems, Mems 98, Proceedings, The Eleventh Annual International Workshop on Heidelberg, Germany Jan. 25-29, 1998, New York, NY, USA, IEEE, "Microfabricated capillarity-driven stop valve and sample injector," 45-50 (Jan. 25, 1998).

* cited by examiner

METHOD OF CONTROLLING A FLOW

CROSS-REFERENCE TO RELATED APPLICATIONS

This is a U.S. national stage entry of International Patent Application No. PCT/EP2012/050680, filed on Jan. 18, 2012, which claims priority to Denmark Patent Application No. PA 2011 70034, filed on Jan. 21, 2011, the contents of all of which are incorporated herein fully by reference.

FIELD OF THE INVENTION

The present invention relates to a method of controlling a flow in a micro conduit system, and particularly a micro conduit system comprising one or more capillary-stop valves.

BACKGROUND

A key element of micro conduit systems for e.g. biochemical analysis is flow control. The flow control typically involves flow inducing means; such as e.g. external pumps for pumping either liquid or air into the micro conduit system. Alternatively, the flow inducing means may provide centrifugal force acting on a liquid contained by the micro conduit system, and/or capillary forces acting on the liquid.

Another key element of flow control is valving, i.e. the control of fluid flow within the micro conduit system by opening and/or closing valves. Throughout the last 15 years numerous schemes for microfluidic valving have been proposed and tested by researchers. The early attempts on devising microfluidic valves often involved moving parts, e.g. embodied in check or gasket valves micro-machined in silicon and often involving a number of different materials.

Work on simpler and more rugged valving systems (see e.g. US2006036348A1) has produced valves without moving parts or with e.g. solidified wax comprising the "moving part". Michigan-based HandyLab has been a leader in developing microfluidic valves based on wax acting as a blocking member, respectively being molten and thus opened on demand by activating microscale ohmic heating elements.

The capillary valve and the closely related hydrophobic valve, collectively referred to as capillary-stop valves, are well-established valve types that have no moving parts and are easily implemented in the production of a micro conduit system. They function by introducing an abrupt increase in the effective contact angle between the liquid to be controlled and the inner surface of the micro conduit system, e.g. by means of change of geometry or a change of the wettabililty of the inner surface of the micro conduit system. A capillary-stop valve may for example comprise a sudden increase of channel diameter with a close to 90 degrees transition from a small to a larger diameter or it may comprise a substantially hydrophobic section or a combination of the two.

PRIOR ART

WO 2006/110,096 A1 describes the opening of a capillary valve of a microfluidic device by means of centrifugal forces.

WO 01/04,909 A1 describes a system wherein a liquid is made to overcome a capillary valve by means of a positive pressure acting on the liquid.

SUMMARY OF THE INVENTION

Capillary-stop valves are traditionally activated by increasing the pressure on the liquid contacting the capillary-stop valve thus overcoming the stopping-effect of the capillary-stop valve. The present invention is based on the surprising discovery that a capillary-stop valve can be activated by an acoustic wave without increasing the pressure on the liquid, but instead by reducing the capillary effect of the capillary-stop valve. This makes the control of liquids in micro conduit systems much more flexible and simplifies the physical interface for controlling the valve.

Thus, an aspect of the invention pertains to a method of controlling the flow of one or more liquid(s) of a micro conduit system comprising a first capillary-stop valve, the method comprising the steps of:
   a) providing a device comprising the micro conduit system, the micro conduit system comprising a first conduit section directly connected to the first capillary-stop valve, said first conduit section furthermore comprising a first liquid, which first liquid contacts and is stopped by the first capillary-stop valve, said micro conduit system furthermore comprises a second conduit section adjoining the first capillary-stop valve, said second conduit section is at least partly in gaseous communication with the first liquid,
   b) providing an acoustic wave source, and
   c) operating the acoustic wave source thereby providing a first acoustic wave at at least one surface interface between the first liquid and the first capillary-stop valve of the micro conduit system, which first acoustic wave has a frequency, amplitude, and duration sufficient to lower the contact angle between the first liquid and the solid surface contacting the liquid front of the first liquid so as to allow the first liquid to overcome the stopping effect of the first capillary-stop valve and enter the second micro conduit section.

Yet an aspect of the invention pertains to a system comprising:
   a device comprising a micro conduit system comprising a first micro conduit section directly connected to a first capillary-stop valve, said first micro conduit section furthermore comprising the first liquid, which first liquid contacts and is stopped by the first capillary-stop valve, and
   an acoustic wave source adapted to provide an acoustic wave to the device thereby allowing the first liquid to flow through the first capillary-stop valve, and
   a control system adapted to operate the acoustic wave source and control it to provide the acoustic wave in a timed manner.

DETAILED DESCRIPTION OF THE INVENTION

Thus, an aspect of the invention pertains to a method of controlling the flow of one or more liquid(s) of a micro conduit system comprising a first capillary-stop valve, the method comprising the steps of:

a) providing a device comprising the micro conduit system, the micro conduit system comprising a first conduit section directly connected to the first capillary-stop valve, said first conduit section furthermore comprising a first liquid, which first liquid contacts and is stopped by the first capillary-stop valve, said micro conduit system furthermore comprises a second conduit section adjoining the first capillary-stop valve, said second conduit section is at least partly in gaseous communication with the first liquid, b) providing an acoustic wave source, and c) operating the acoustic wave source thereby providing a first acoustic wave at at least one surface interface between the first liquid and the first capillary-stop valve of the micro conduit system, which first acoustic wave has a frequency, amplitude, and duration sufficient to lower the contact angle between the first liquid and the solid surface contacting the liquid front of the first liquid so as to allow the first liquid to overcome the stopping effect of the first capillary-stop valve and enter the second micro conduit section.

Figure 5:
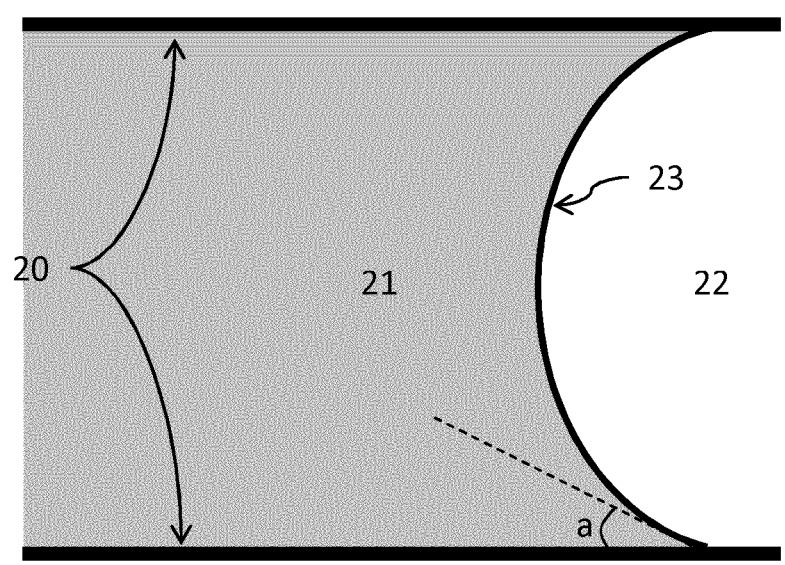
FIG. 5 illustrates the measurement of the contact angle, a, between a liquid and the surface of a solid material.

In the context of the present invention the term "contact angle" relates to the inner angle between the surface of a solid material and a liquid where the liquid contacts both the surface and a gas such as air. This has been depicted in FIG. 5 showing the surface of a solid material (20), e.g. a micro channel wall, a liquid (21) contacting the surface, and a gas (22) contacting both the liquid (21) and the surface (20). The contact angle, a, is measured as the angle at which a liquid/gas interface (23) meets the surface of the solid material. The solid surface contacting the first liquid typically forms part of the first micro conduit section.

In the context of the present invention the term "liquid" should be interpreted broadly and encompasses for example chemically pure liquids, mixtures of two or more liquid chemicals, solutions, and suspensions of particles or cells. Aqueous liquids, i.e. liquids which contain water in an amount of at least 25% (w/w) relative to the weight of the liquid, are particularly preferred, and are frequently used in biochemical analysis.

In the context of the present invention the term "device" relates to the object in which the liquid flow is to be controlled. The device may be a so-called microfluidic system, a micro-TAS (micro-total analysis) device, a lab-on-a-chip device, or a biochip device. Such a device can be produced in a multitude of different materials, such as silicon, glass, ceramics and/or organic polymers, such as thermoplastic polymer.

The device may be prepared in many different ways, e.g. using conventional micro-fabrication techniques, such as micro-milling, injection molding, hot embossing, and/or laser machining. The device may be implemented as a highly complex, multilayered structure or as a simple structure comprising a single layer. Relatively simple devices comprising as few device parts as possible are presently preferred. The device parts are the parts of which the device is assembled, and in some preferred embodiments of the invention the device parts comprise a lid and a base part. The base part typically comprises a surface into which the micro conduit system has been imprinted or otherwise created, and onto which surface the lid has to be attached to complete the micro conduit system. In this case, the walls of the micro conduit system are partly or completely formed by the base part and the lid.

In the context of the present invention the term "capillary-stop valve" pertains to a conduit structure capable of stopping the flow of a liquid through a change in capillary forces exerted on the liquid front of the liquid. This may e.g. be accomplished via the geometry of the conduit structure, e.g. a sudden expansion of a channel or a sharp corner, or via a change of the surface wettability of the conduit structure relative to the wettability of the surface of the conduits which adjoins the capillary-stop valve. A hydrophobic surface section in a hydrophilic micro conduit system is for example known to stop the capillary flow of a hydrophilic liquid through the micro conduit system.

A characteristic feature of a capillary-stop valve is that it provides gaseous communication between the two conduit micro sections that are separated by the capillary-stop valve.

In the context of the present invention, the term "micro conduit system" relates to one or more interconnected micro conduit components comprised by the device. Typical micro conduit components are micro channels, micro chambers, micro filters, micro cuvettes, micro mixers, micro pumps and/or micro valves. A micro conduit component typically has a smallest cross sectional dimension in the range of 0.1-1000 micron. It may for example be preferable that a micro conduit component has a smallest cross sectional dimension in the range 5-500 micron. It may be even more preferred that a micro conduit component has a smallest cross sectional dimension in the range 10-250 micron.

In the context of the present invention, the phrase "Y and/or X" means "Y" or "X" or "Y and X". Along the same line of logic, the phrase "$n_1$, $n_2$, . . . , $n_{i-1}$, and/or $n_i$" means "$n_1$" or "$n_2$" or . . . or "$n_{i-1}$" or "$n_i$" or any combination of the components: $n_1$, $n_2$, . . . $n_{i-1}$, and $n_i$.

In the context of the present invention, the term "conduit section" relates to a part of the micro conduit system. A conduit section may for example be a micro channel or a micro chamber, or smaller part of a micro channel or a micro chamber.

In the context of the present invention, the term "surface interface between a liquid and a capillary-stop valve" relates to a surface of the capillary-stop valve which is contacted by the liquid.

In the context of the present invention the term "acoustic wave" relates to acoustic oscillation of one or more material(s). The acoustic wave may for example be a standing wave or a wave propagation through at least part of the material(s) in question. The acoustic wave may for example have a wave length and frequency in a narrow range or it may be a combination of two or more super-imposed waves.

In some preferred embodiments of the invention the acoustic wave comprises, or even essentially consists of, a single acoustic pulse or wave front which propagates through at least a part of the device.

In some preferred embodiments of the invention the acoustic wave comprises two or more acoustic pulses which propagate through at least part of the device.

In some embodiments of the invention the second micro conduit section comprises a micro channel directly connected to the first capillary-stop valve.

In the context of the present invention the term "directly connected", used to describe two micro conduit components, means that the two micro conduit components are adjoined and in fluid communication with each other.

In some embodiments of the invention the second micro conduit section furthermore comprises a chamber in fluid communication with the first capillary-stop valve.

Different types of liquids may be controlled and handled by the present invention. For examples, the first liquid may be hydrophilic.

In the context of the present invention, a "hydrophilic liquid" is a liquid which has a solubility in water of at least 1 g liquid per 100 g water having a temperature of 25 degrees C. In some preferred embodiments of the invention the first liquid is an aqueous liquid which contains a considerable amount of water, e.g. at least 50% (w/w) water relative to the total weight of the first liquid.

Alternatively, the first liquid may be hydrophobic. In the context of the present invention, a "hydrophobic liquid" has solubility in water of less than 1 g liquid per 100 g water having a temperature of 25 degrees C.

Any useful liquid handling scheme may be used for moving the liquid(s) through the micro conduit system. For example, the liquid(s) of the micro conduit system, e.g. the first liquid, may e.g. be pumped actively through the micro conduit system using one or more external pump(s) and/or one or more pumps integrated with the device. Alternatively, or additionally, the liquid(s) of the micro conduit system may be moved by capillary forces between the inner walls of the micro conduit system and the liquid. Alternatively, or additionally, the liquid(s) of the micro conduit system may be moved by gravity, centrifugal forces, vacuum and/or a pressurised gas.

Capillary-stop valves useful for the present invention are typically able to stop the flow of a liquid, at least at low or moderate liquid pressure, and gain this ability from their structural design and/or surface wettability.

For example, a capillary-stop valve may be implemented as one or more sharp edge(s) in the wall of a micro channel, which edges increase the effective contact angle between the liquid to be stopped and the wall material of the micro channel.

Several useful examples of capillary-stop valves have been schematically illustrated (top views) in FIG. 4.

Figure 4A:
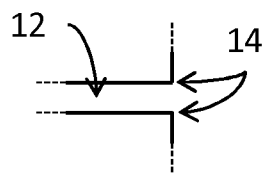
FIGS. 4a-h show schematic top views of various types of capillary-stop valves.
Figure 4B:
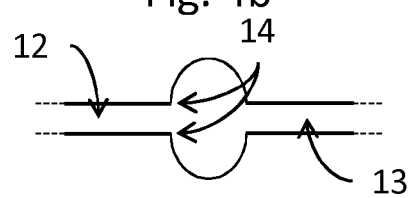
Figure 4C:
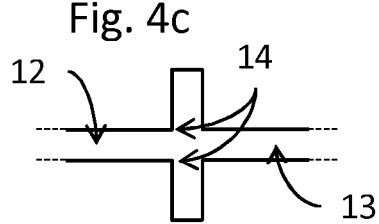
Figure 4D:
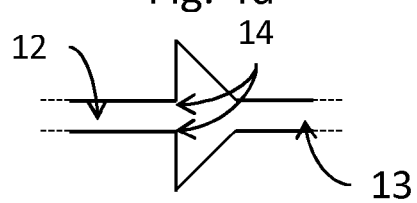
Figure 4E:
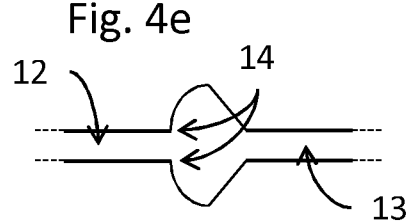

FIG. 4a shows a micro channel (12) feeding into a generic capillary-stop valve in the form of a pair of sharp edges (14) expanding the micro channel into something else. When the liquid to be stopped meets the sharp edges it experiences a significant increase in the effective contact angle between the liquid and the walls of the micro channel, and this increased contact angle is normally sufficient for stopping to flow of the liquid.

FIGS. 4b-4e show different capillary-stop valve designs which all involve a first micro channel (12) separated from a second micro channel (13) by a capillary-stop valve, which capillary-stop valves comprise a pair of sharp edges (14) contacting the first micro channel (12).

Figure 4F:
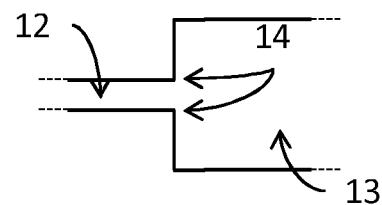

FIG. 4f illustrates a capillary-stop valve connecting a first micro channel (12) to a second micro channel (13) which is wider, and possibly also deeper, than the first micro channel (12). This capillary-stop valve also includes a pair of sharp edges (14) where the first micro channel expands into the second micro channel. Alternatively, a capillary-stop valve may be the opening from a micro channel into a chamber, such as e.g. a micro chamber.

Figure 4G:
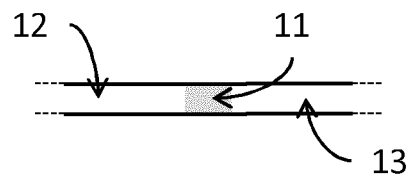

FIG. 4g illustrates a different type of capillary-stop valve. Here the capillary-stop valve is formed by one or more surface(s) having a poorer wettability (11) with respect to the liquid to be stopped than the wall surface of the first micro channel (12) and the second micro channel (13). When the liquid to be stopped meets the surface(s) of poorer wettability the contact angle between the liquid and the surface is increased to a level where the flow of liquid stops.

Figure 4H:
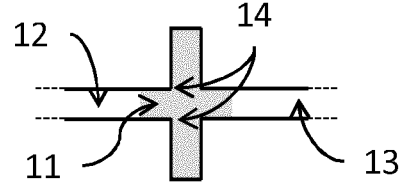

FIG. 4h illustrates a capillary-stop valve which both contains a pair of sharp edges (14) and one or more surface(s) having a poorer wettability (11) with respect to the liquid to be stopped than the wall surface of the first micro channel (12).

Other examples of useful capillary-stop valves are described in Cho et al. ("How the capillary burst microvalve works"; H. Cho, H. Kim, J. Kang, T. Kim; Journal of Colloid and Interface Science 306 (2007) 379-385, Elsevier) which is incorporated herein by reference for all purposes.

The acoustic wave, e.g. the first acoustic wave, preferably has a frequency, amplitude and duration sufficient to lower the contact angle between the first liquid and the surface contacting the liquid front so as to allow the liquid to overcome the stopping effect of the first capillary-stop valve.

In some embodiments of the invention the acoustic wave has a frequency in the range of about 20 Hz-20 kHz.

In some embodiments of the invention the acoustic wave has a frequency of at least 20 kHz. For example, the acoustic wave may have a frequency in the range of 20 kHz-200 kHz.

In some embodiments of the invention the acoustic wave has a frequency of at least 500 Hz.

The acoustic wave may for example have a frequency in the range of 500 Hz-250 kHz, preferably in the range of 1000 Hz-150 kHz, and even more preferably in the range of 10 kHz-100 kHz. Alternatively, the acoustic wave may have a frequency in the range of 5 kHz-60 kHz, preferably in the range of 10 kHz-40 kHz, and even more preferably in the range of 15 kHz-30 kHz.

The duration of the acoustic wave is sufficiently long to allow the liquid to overcome the stopping-effect and flow through the capillary-stop valve. In some embodiments of the invention the duration of the acoustic wave is at least 10 microsec. For example the duration of the acoustic wave may be at least 50 microsec, preferably at least 0.1 millisec and even more preferred at least 1 millisec. The duration of the acoustic wave may e.g. be at least 10 millisec, preferably at least 50 millisec and even more preferred at least 100 millisec In some preferred embodiments of the invention the duration of the acoustic wave is in the range of 10 microsec-10 sec. For example the duration of the acoustic wave may be in the range of 100 microsec-1 sec. Preferably, the duration of the acoustic wave is in the range of 1 millisec-0.5 sec. Even more preferred the duration of the acoustic wave is in the range of 5 millisec-0.1 sec.

In the context of the present invention the term "acoustic wave source" pertains to the component which is used to generate the acoustic wave. The acoustic wave source may provide the acoustic wave directly or it may provide it indirectly, e.g. by interacting with a part of the device.

In some embodiments of the invention the acoustic wave source comprises, or even essentially consists of, a heating element.

In some preferred embodiments of the invention the heating element heats a material having a sufficient thermal expansion and/or volume change due to phase transition to generate the acoustic wave during operation of the heating element. In this case the acoustic wave source provides the acoustic wave indirectly.

The heating element is preferably operated to achieve fast expansion of the heating element itself and/or a neighbouring material. Once the sufficient expansion has been achieved, the heating element and/or the material is allowed to cool and thus contracts. The cycles of heating and cooling are preferably sufficiently fast to obtain cycles of expansion and contraction which generate an appropriate acoustic wave.

During such a cycle of heating and cooling, the duration of the heating and the duration of the cooling may be of the same length. Alternatively, the duration of the heating may be shorter than the duration of the cooling, or vice versa. For example, the duration of the heating may be in the range of 1-10 microsec, and the duration of the cooling may be in the range of 10-70 microsec.

In some embodiments of the invention the material to be heated is a liquid, which forms part of the device. It is particularly preferred that rapid heating and cooling of the liquid create rapidly expanding/imploding bubbles, which results in an acoustic wave. The acoustic wave may for example be provided by the methods and using the systems and devices of WO 2006/069,577 A1, which is incorporated herein by reference for all purposes.

The liquid to be heated may for example be a portion of the first liquid.

In other embodiments of the invention the material to be heated is a non-liquid material, which forms part of the device.

In some preferred embodiments of the invention the heating element itself has a sufficient thermal expansion and/or volume change during phase transition to provide an acoustic wave during operation of the heating element. An example of such a heating element is a bimetallic heating element, which both provides heat and expansion and/or deflection.

In some preferred embodiments of the invention the heating element is an absorber of electromagnetic radiation. The absorber is preferably operated by irradiating it with a beam of electromagnetic radiation having a wavelength which is at least partly absorbed by the absorber.

The absorber may for example be irradiated by a pulsed laser beam, which results in an increased temperature of the heating element, and optionally also dissipation of heat to the surroundings of the heating element.

In preferred embodiments of the invention the pulsing frequency of the laser beam matches the intended frequency of the acoustic wave.

Examples of other useful types of heating elements are microwave absorbers or magnetic induction loss heaters.

In other embodiments of the invention, the acoustic wave source comprises, or even essentially consists of, an electromechanical acoustic transducer. Examples of useful acoustic transducers are e.g. a piezo element, a magnetostrictive element, or an electromagnetic element.

More than one acoustic wave source may be used, e.g. when the device comprises more than one capillary-stop valve, and in this case a combination of different types of acoustic wave sources may be employed and operated in parallel or in sequence.

In some preferred embodiments of the invention the acoustic wave source forms part of the device.

In other preferred embodiments of the invention the acoustic wave source is located outside the device but arranged so as to provide an acoustic wave to the device.

The acoustic wave may for example be provided to the entire device. In this way an acoustic wave is able to open a plurality of capillary-stop valves which each stops a liquid.

In preferred embodiments of the invention, the duration of the acoustic wave is shorter than the expected travel time of the liquid between the capillary-stop valve to be opened and the next capillary-stop valve of the micro conduit system. For example Alternatively, the acoustic wave is primary provided to the vicinity of the capillary-stop valve to be opened and is not sufficiently powerful to open all capillary-stop valves of the device. This is particularly useful for sequential activation of multiple capillary-stop valves or for activation of a capillary-stop valve of a device which contains components, biological or non-biological, which are damaged by the acoustic wave.

Thus, in some preferred embodiments of the invention, the smallest distance between the acoustic wave source and the capillary-stop valve to be opened, e.g. the first capillary-stop valve or the second capillary-stop valve, is at most 15 mm, preferably at most 10 mm, and even more preferably at most 5 mm. For example, the smallest distance between the acoustic wave source and the capillary-stop valve to be opened may be at most 1 mm, preferably at most 0.5 mm, and even more preferably at most 0.1 mm.

In some preferred embodiments of the invention, the acoustic wave has a frequency, amplitude, and duration sufficient to open at least one capillary-stop valve, e.g. the first capillary valve, for the passage of the liquid, but insufficient to open at least one other capillary-stop valve of the device.

In some preferred embodiments of the invention, the acoustic wave has a frequency and amplitude sufficient to open the capillary-stop valve, e.g. the first capillary valve, for the passage of the liquid, but insufficient to open at least one other capillary-stop valve of the device.

When the method of the invention is used for liquid handling as part of a chemical analysis, the micro conduit system usually contains a reagent and frequently two or more reagents. For example, the micro conduit system may comprise a reaction zone comprising at least one reagent.

In some preferred embodiments of the invention the micro conduit system, e.g. the reaction zone, comprises at least one immobilized reagent. The immobilized reagent may comprise one or more reagents selected from the group consisting of an antigen, an epitope, an enzyme, a nucleic acid, an antibody, a receptor, a peptide, a protein, a protein fragment, a liposome, a cell, a cell organelle, and combinations thereof.

The term "nucleic acid" should be interpreted broadly and encompasses e.g. DNA and RNA, synthetic nucleic acids, like LNA and PNA, double stranded nucleic acids and single stranded nucleic acids, and derivatives thereof.

In some preferred embodiments of the invention the micro conduit system, e.g. the reaction zone, furthermore comprises at least one dried reagent. The dried reagent may comprise one or more reagents selected from the group consisting of an antigen, an epitope, an enzyme, a nucleic acid, an antibody, a receptor, a peptide, a protein, a protein fragment, a liposome, a cell, a cell organelle, a salt, a dNTP, and a pH-buffer salt. The dried reagent may also comprise e.g. particles, nanotubes, nanoballs, or nanoshells.

The micro conduit system, e.g. the reaction zone, may contain a plurality of reagents, such as at least two, three or four reagents. These reagents may be selected among the reagents mentioned herein.

In some preferred embodiments of the invention the micro conduit system, e.g. the reaction zone, comprises at least some of the reagents for performing a Polymerase Chain Reaction (PCR) process and preferably the micro conduit system comprises all the reagents.

The micro conduit system may comprise a polymerase enzyme such as a DNA polymerase. The micro conduit system may comprise a salt such as $MgCl_2$. The micro conduit system may comprise dNTPs, i.e. the nucleotides for performing the PCR process. The micro conduit system may comprise the nucleic acid primers. The micro conduit system may comprise the polymerase, the $MgCl_2$, the dNTPs and the PCR primers.

In some preferred embodiments of the invention at least a portion of the surface of the micro conduit system comprises a salt. The salt may e.g. be a pH buffer salt. Examples of useful salts are $MgCl_2$, $NH_4Cl$, NaCl, KCl, TB (Tris-Borate), TBE (Tris-Borate-EDTA), or Tris. These may be used alone or in combination.

In some embodiments of the invention the micro conduit system furthermore comprises a detection zone. The detection zone is a surface or a volume of the micro conduit system on/in which the presence and/or quantity of one or more molecular component(s) can be measured.

In some embodiment of the invention the detection zone comprises one or more sensor element(s). Examples of useful sensor elements are one or more electrodes, a micro sensor array, a micro cantilever, a surface acoustic wave device, or a combination thereof.

In some embodiment of the invention one or more external sensor element(s) is/are used for the measurement. For example, an external sensor element may form part of the device but be outside the detection zone. Alternatively, an external sensor element may be located outside the devices.

In some preferred embodiment of the invention, the device comprises at least one transparent section contacting the detection zone. The device may for example comprise two transparent sections which contact the detection zone, and which two transparent sections are located on each their side of detection zone to allow for absorbance or light scattering measurements through the detection zone.

In some preferred embodiment of the invention the method comprises one or more measurement step(s). A measurement steps may e.g. involve performing a measurement via one or more detection zone(s) of the device.

For example, the detection zone may at least partly overlap with the reaction zone.

The micro conduit system may furthermore comprise components such as vents and/or reagents reservoirs.

As said, the micro conduit system may comprise more than one capillary-stop valve, e.g. at least two capillary-stop valves or at least three capillary-stop valves.

Thus, in some preferred embodiments of the invention the second micro conduit section of the micro conduit system is furthermore directly connected to a second capillary-stop valve, and wherein the second capillary-stop valve is capable of stopping a liquid.

In some embodiments of the invention the second conduit section comprises a reaction zone, located between the first capillary-stop valve and the second capillary-stop valve. In such embodiments step c) may furthermore comprise
contacting the reaction zone with the first liquid, and
stopping the flow of the first liquid with the second capillary-stop valve.

In some preferred embodiments of the invention the second conduit section furthermore comprises a detection zone, e.g. at least partly overlapping the reaction zone. In such embodiments step c) may furthermore comprise detecting a physical or chemical change related to a component of the first liquid via the detection zone.

In some embodiments of the invention the micro conduit system furthermore comprises a third conduit section contacting the second capillary-stop valve.

It is sometimes desirable to be able to handle more than one liquid in the micro conduit system, e.g. a second liquid or even a third liquid.

In some embodiments of the invention, the second conduit section contains a second liquid, which second liquid contacts and is stopped by the second capillary-stop valve, said micro conduit system furthermore comprises a third micro conduit section adjoining the second capillary-stop valve, said third micro conduit section is at least partly in gaseous communication with the second liquid, and wherein the method furthermore comprises the step:

d) providing a second acoustic wave at at least one surface interface between the second liquid and the second capillary-stop valve of the second micro conduit system, which second acoustic wave has a frequency, amplitude, and duration sufficient to lower the contact angle between the second liquid and the solid surface contacting the liquid front of the second liquid so as to allow the second liquid to flow through the second capillary-stop valve and enter the third micro conduit section.

The second liquid may be identical to the first liquid, or a liquid derived from the first liquid, e.g. by reaction with a reagent or by separation of the first liquid. Alternatively the second liquid may be different from the first liquid.

In some preferred embodiments of the invention, the acoustic wave source that provides the first acoustic wave, which opens the first capillary-stop valve, is the same acoustic wave source which provides the second acoustic wave, or even further acoustic waves, for opening the second capillary-stop valve or further capillary-stop valves. In this way, a single acoustic wave source may be used to open several, or even all, of the capillary-stop valves of the device. As stated herein, one can avoid that the same acoustic wave opens two serially connected capillary-stop valves of the same micro conduit system to a liquid by keeping the duration of the acoustic wave shorter than the travel time of the liquid between the two capillary-stop valves.

The present invention allows for easy handling of more micro conduit systems in the same device and makes it possible to conduct many chemical or biochemical analyses in parallel.

Thus, in some preferred embodiments of the invention the device provided in step a) comprises at least two micro conduit systems as defined herein. The device may contain even more micro conduit systems, such as at least 5 micro conduit systems, preferably at least 10 micro conduit systems, and even more preferably at least 100 micro conduit systems or at least 500 micro conduit systems. These micro conduit systems may be operated in parallel or individually depending on the specific application.

In some embodiments of the invention the first liquids of the at least two micro conduit systems represent the same liquid sample. That is, the first liquids of the at least two micro conduit systems are substantially identical, but for the variation which can be ascribed to sampling.

In some embodiments of the invention the first liquids of the at least two micro conduit systems have been introduced to the at least two micro conduit systems through the same inlet.

The acoustic waves are preferably provided in a well-timed manner, which allows for a well-timed opening of the capillary-stop valves and thus of the liquid handling as such.

The precise timing allows for precise control of chemical or biochemical reaction times within the micro conduit system and for a better precision of chemical or biochemical analyses, when the micro conduit system is used for such purposes.

Yet an aspect of the invention relates to a system comprising:
- a device comprising a micro conduit system comprising a first micro conduit section directly connected to a first capillary-stop valve, said first micro conduit section furthermore comprising the first liquid, which first liquid contacts and is stopped by the first capillary-stop valve, and
- an acoustic wave source adapted to provide an acoustic wave to the device thereby allowing the first liquid to flow through the first capillary-stop valve, and
- a control system adapted to operate the acoustic wave source and control it to provide the acoustic wave in a timed manner.

The system may furthermore comprise other apparatus, such as one or more external pump(s), a computer for controlling various components of the system, a display device for user control of the system and/or for presenting the results of the measurements provided by the system.

Two exemplary embodiments of the invention are described by the figures.

Figure 1A:
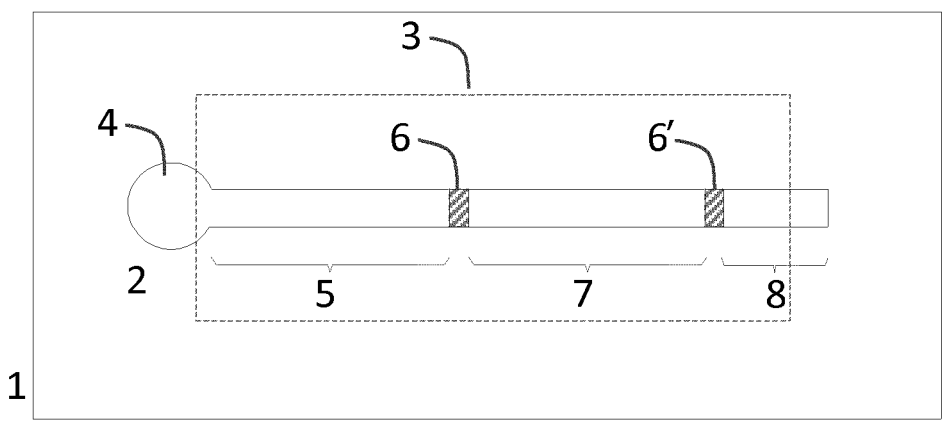
FIG. 1a shows a schematic top view of a device comprising a simple micro conduit section containing a capillary-stop valve.

FIG. 1a shows a schematic top view of a device (1), which comprises a first body (2) into which a micro conduit system, in this case an open channel system, has been created. The micro conduit system comprises an inlet (4), a first conduit section (5) directly connected to a first capillary-stop valve (6), and a second conduit section (7) directly connected to the first and a second capillary-stop valve (6'). The second capillary-stop valve (6') is furthermore directly connected to a third conduit section (8). The device (1) furthermore comprises a second body (3) attached to the first body (2) so as to provide an additional wall to the open channel system of the first body (2). The second body (3) is placed so as to keep the inlet (4) open and additionally keep a portion of the third micro conduit section open so it may function as a gas vent for the micro conduit system.

Figure 1B:
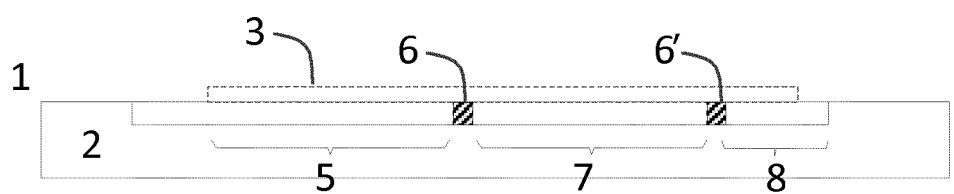
FIG. 1b shows a schematic, cross sectional side view of the device of FIG. 1a, FIG. 2a shows a schematic top view of the device of FIG. 1a comprising a first liquid.

A cross-sectional side view of the device of FIG. 1a is shown in FIG. 1b.

The first and second capillary-stop valves (6 and 6') may for example be hydrophobic-type capillary-stop valves, i.e. a conduit section having a hydrophobic surface.

Figure 2A:
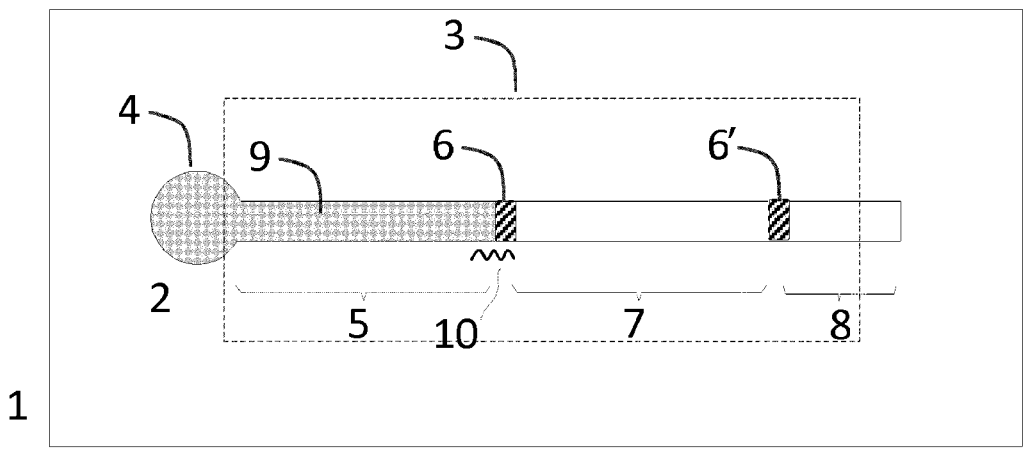
FIG. 2b shows the device of FIG. 2a after the capillary-stop valve has been opened.
Figure 2B:
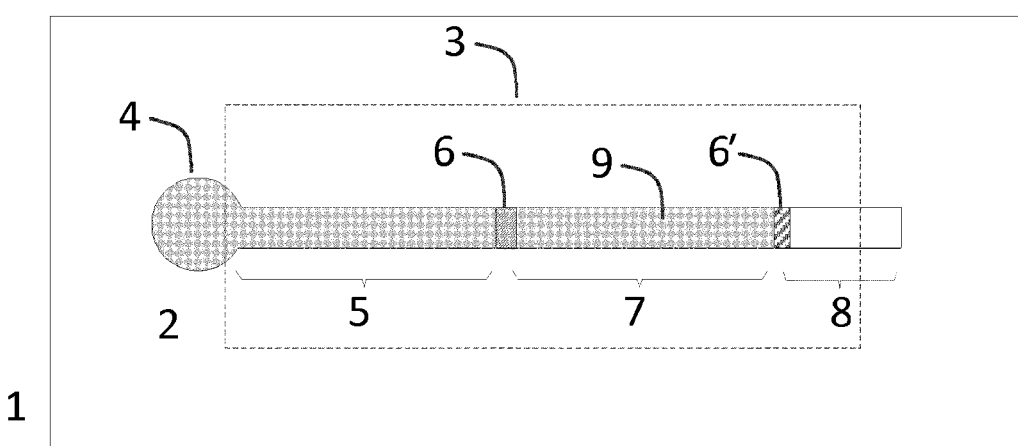

The principle of the method of the invention is illustrated in FIGS. 2b and 2b. FIG. 2a shows the device (1) of FIG. 1a and a first liquid (9), which has been introduced into the first micro conduit section (5) via the inlet (4). The first liquid (9) is contacting and stopped by the first capillary-stop valve (6). In order to open the first capillary-stop valve (6) for the passage of the first liquid (9) an acoustic wave (10) is provided by operating an acoustic wave source (not shown).

The acoustic wave reduces the stopping effect of the first capillary-stop valve sufficiently to allow the first liquid to move through the first capillary-stop valve (6) and enter the second micro conduit section (7). The first liquid is finally stopped by the second capillary-stop valve (6'), and FIG. 2b depicts the device in this situation.

Figure 3A:
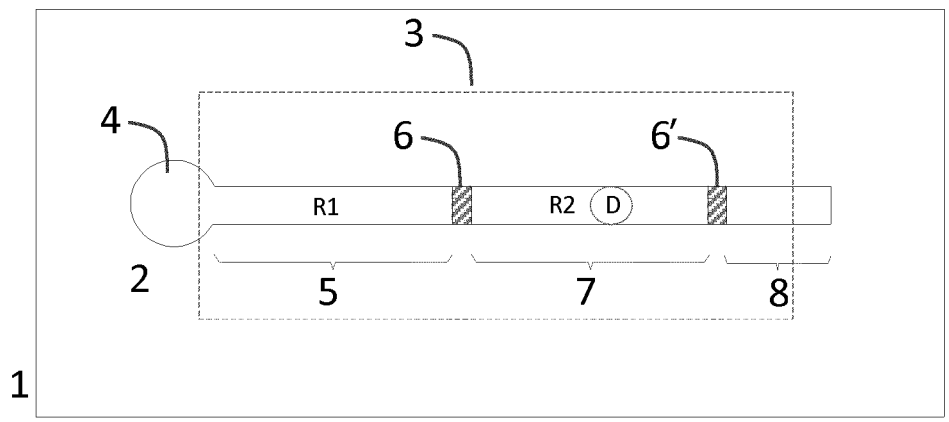
FIGS. 3a-c show a variant of FIGS. 1a, 2a, and 2b wherein the device comprises a first reagent (R1), a second reagent (R2) and a detection zone (D)
Figure 3B:
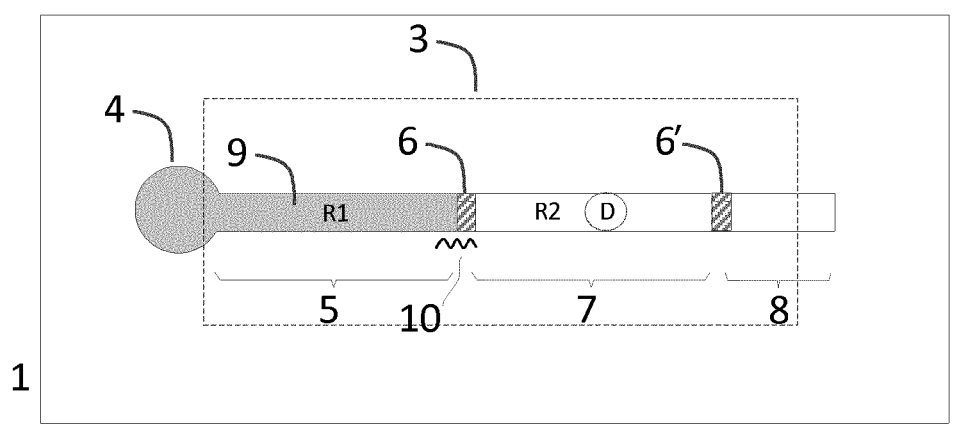
Figure 3C:
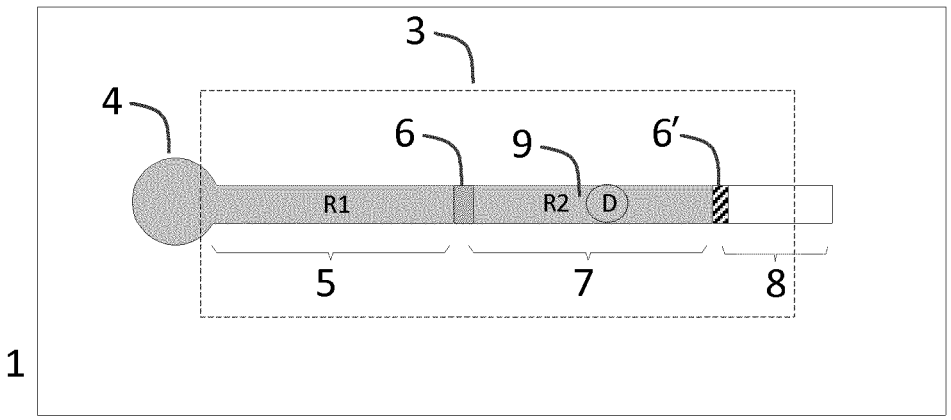

Another exemplary embodiment of the invention is shown in FIGS. 3a-c. The device of FIG. 3a is similar to the device described above on the context of FIG. 1a with the exception that the first conduit section (5) furthermore contains a first reagent (R1), and the second conduit section furthermore contains a second reagent (R2) and a detection zone (D). The first and second reagents may e.g. be present in dried and/or highly viscous form.

In FIG. 3b, the first liquid (9), e.g. a liquid sample to be analysed, has been introduced into the first micro conduit section (5) via the inlet (4) and the first reagent interacts with the first liquid, e.g. by adjusting the pH of the first liquid. The acoustic wave source (not shown) is operated to provide the acoustic wave (10) which opens the first capillary-stop valve to the first liquid and allows it to enter the second micro conduit section. The first liquid is stopped upon contacting the second capillary-stop valve, and the second micro conduit section therefore contains a well-defined volume of the first liquid (See FIG. 3c). The first liquid (9) is allowed to react with the second reagent (R2) for a precisely defined period of time and various parameters may be measured during or after the reaction via the detection zone (D).

The present invention has been described above with reference to specific embodiments. However, other embodiments than the above described are equally possible within the scope of the invention. The different features and steps of the various embodiments and aspects of the invention may be combined in other ways than those described herein unless it is stated otherwise.

EXAMPLES

Example 1

Production of a Test Device Comprising a Micro Conduit System and a Capillary-Stop Valve A microfluidic structure was laser micromachined in PETG (Polyethylene terephthalate) sheet polymer having a thickness of 1 mm. The structure comprised a straight micro channel, 100 µm wide and 50 µm deep and 30,000 µm long. Perpendicular to said micro channel, additional 100 µm channels were machined having a length of 500 µm and a depth of 50 µm. The perpendicular channels are the capillary stop valves. The channel part of the PETG sheet was treated with an infrared absorber dye having peak absorption at and around 808 nm; the absorber would absorb infrared electromagnetic radiation and transform the light energy into joule heat. The structure was covered with a self-adhesive translucent lid such that the opposing ends of the 30,000 µm were left uncovered, thus the one end of the 30,000 µm channel was able to accept a liquid and the opposing end would act as an air vent.

Example 2

Liquid Handling Using the Test Device of Example 1

In the one end the channel was loaded with liquid comprising water with 0.5% Triton-X100 detergent; a mixture that will provide adequate capillary drag in PETG micro channels. The liquid entered the channel and filled the first part of the 30,000 µm channel up till the first perpendicular channel;—the capillary stop valve. The device comprising the microfluidic structure was placed on a translucent plate through which a focused diode laser beam was shone (808 nm, 500 mW), the laser beam being focused at the interface between liquid and PETG where the infrared absorber was present. The laser beam was pulsed for 3 µs after which it was shut down for 47 µs, this cycle then being repeated. The focused 500 mW beam will evaporate a sheath of liquid that will eventually expand and exert a high pressure on the surrounding liquid. Since only a small amount of liquid is evaporated, it will at some point within 15 to 25 μs cool to a point where it will condense and thus contract; eventually a vapor bubble will respectively form, expand, contract and condense for every 50 μs cycle and will thus produce a 20 kHz ultrasonic wave in the surroundings of the focused laser beam.

Upon focusing said laser beam in the liquid front plug in the immediate vicinity of the first capillary valve we were able to induce a change in capillary force that would—within a 1-2 second timeframe—allow the liquid front to overcome the stopping ability of the capillary valve so that the liquid would continue flowing through the channel until being halted by a second capillary valve. Refocussing the laser beam to the second capillary stop valve and repeating the action described above, we were able to repeat the effect and thus open the second capillary stop valve.

The invention claimed is:

1. A method of controlling the flow of one or more liquid(s) of a micro conduit system comprising a first capillary-stop valve, the method comprising the steps of:
    a) providing a device comprising the micro conduit system, the micro conduit system comprising a first conduit section directly connected to the first capillary-stop valve, said first conduit section furthermore comprising a first liquid, which first liquid contacts and is stopped by the first capillary-stop valve, said micro conduit system furthermore comprises a second conduit section adjoining the first capillary-stop valve, said second conduit section is at least partly in gaseous communication with the first liquid,
    b) providing an acoustic wave source, and
    c) operating the acoustic wave source thereby providing a first acoustic wave at at least one surface interface between the first liquid and the first capillary-stop valve of the micro conduit system, which first acoustic wave has a frequency, amplitude, and duration sufficient to lower the contact angle between the first liquid and the solid surface contacting the liquid front of the first liquid so as to allow the first liquid to overcome the stopping effect of the first capillary-stop valve and enter the second micro conduit section.

2. The method according to claim 1, wherein the acoustic wave has a frequency of at least 500 Hz.

3. The method according to claim 2, wherein the acoustic wave has a frequency in the range of 500 Hz-250 kHz.

4. The method according to claim 1, wherein the duration of the acoustic wave is at least 10 microsec.

5. The method according to claim 4, wherein the duration of the acoustic wave is in the range of 10 microsec-10 sec.

6. The method according to claim 1, wherein the acoustic wave source comprises a heating element.

7. The method according to claim 6, wherein the heating element heats a material having a sufficient thermal expansion and/or change of volume during phase transition to generate the acoustic wave during operation of the heating element.

8. The method according to claim 7, wherein the material to be heated is a liquid, which forms part of the device.

9. The method according to claim 8, wherein the liquid is the first liquid.

10. The method according to claim 7, wherein the material to be heated is a non-liquid material, which forms part of the device.

11. The method according to claim 6, wherein the heating element is an absorber of electromagnetic radiation.

12. The method according to claim 11, wherein the absorber is irradiated by electromagnetic radiation.

13. The method according to claim 12, wherein the electromagnetic radiation is provided by a laser.

14. The method according to claim 1, wherein the acoustic wave source comprises an acoustic transducer.

15. The method according to claim 1, wherein the acoustic wave source forms part of the device.

16. The method according to claim 1, wherein the acoustic wave source is located outside the device but arranged so as to provide an acoustic wave to the device.

17. The method according to claim 1, wherein the acoustic wave is provided to the entire device.

18. The method according to claim 1, wherein the second micro conduit section comprises a micro channel directly connected to the first capillary-stop valve.

19. The method according to claim 18, wherein the second micro conduit section furthermore comprises a chamber in fluid communication with the first capillary-stop valve.

20. The method according to claim 1, wherein the first liquid is hydrophilic.

21. The method according to claim 1, wherein the first liquid is hydrophobic.

22. The method according to claim 19, wherein the second micro conduit section of the micro conduit system is furthermore directly connected to a second capillary-stop valve, and wherein the second capillary-stop valve is capable of stopping a liquid.

23. The method according to claim 22, wherein the second conduit section comprises a reaction zone, and wherein step c) furthermore comprises
    contacting the reaction zone with the first liquid, and
    stopping the flow of the first liquid with the second capillary-stop valve.

24. The method according to claim 23, wherein the second conduit section furthermore comprises a detection zone and wherein step c) furthermore comprises detecting a physical or chemical change related to a component of the first liquid via the detection zone.

25. The method according to claim 18, wherein the micro conduit system furthermore comprises a third conduit section contacting the second capillary-stop valve.

26. The method according to claim 25, wherein the second conduit section contains a second liquid, which second liquid contacts and is stopped by the second capillary-stop valve, said micro conduit system furthermore comprises a third micro conduit section adjoining the second capillary-stop valve, said third micro conduit section is at least partly in gaseous communication with the second liquid, and wherein the method furthermore comprises the step:
    d) providing a second acoustic wave at at least one surface interface between the second liquid and the second capillary-stop valve of the second micro conduit system, which second acoustic wave has a frequency, amplitude, and duration sufficient to lower the contact angle between the second liquid and the solid surface contacting the liquid front of the second liquid so as to allow the second liquid to flow through the second capillary-stop valve and enter the third micro conduit section.

27. The method according to claim 1, wherein the device provided in step a) comprises at least two micro conduit systems as defined in any of the preceding claims.

28. The method according to claim 27, wherein the first liquids of the at least two micro conduit systems represent the same liquid sample.

29. The method according to claim 28, wherein the first liquids of the at least two micro conduit systems have been introduced to the at least two micro conduit systems through the same inlet.

\* \* \* \* \*